United States Patent [19]
Kuse

[11] Patent Number: 5,478,227
[45] Date of Patent: Dec. 26, 1995

[54] VERTICAL INJECTION MOLDING MACHINE HAVING A DISCHARGE MATERIAL RECEIVING DEVICE

[75] Inventor: Kazuki Kuse, Toyama, Japan

[73] Assignee: YKK Corporation, Tokyo, Japan

[21] Appl. No.: 326,966

[22] Filed: Oct. 21, 1994

[30] Foreign Application Priority Data

Oct. 29, 1993 [JP] Japan .................................. 5-271891

[51] Int. Cl.$^6$ ................................................. B29C 45/23
[52] U.S. Cl. ............................ 425/216; 264/39; 425/562
[58] Field of Search .................................. 425/215, 216, 425/217, 562, 577, 578, 582; 264/37, 39

[56] References Cited

FOREIGN PATENT DOCUMENTS

| 0055464 | 7/1982 | European Pat. Off. . |
|---|---|---|
| 42 14 081 | 11/1992 | Germany . |
| 56-70926 | 6/1981 | Japan . |
| 4110115 | 4/1992 | Japan . |
| WO93/03907 | 3/1993 | WIPO . |

*Primary Examiner*—Tim Heitbrink
*Attorney, Agent, or Firm*—Hill, Steadman & Simpson

[57] ABSTRACT

A vertical-type injection molding machine comprising a lower fixed mold half mounted on a machine base, an upper movable mold half situated upwardly of the lower fixed mold half in confronting relationship therewith, and a material reservoir for storing a cleaning material and a various kinds of molding materials individually. The material reservoir has a switching device for switching one kind of molding material over another. The injectin molding machine also comprises an injector having a nozzle, an injection cylinder, and a molding material supply unit connected to the switching device via a material supply pipe, a device for opening and closing a tip of said nozzle during the switching of the molding materials, and a discharged material receiving device reciprocatingly movable between a position right under the nozzle tip and a position right above a material discharge portion on the side of said upper movable mold half and adapted to be inverted by 180°.

6 Claims, 4 Drawing Sheets

VERTICAL INJECTION MOLDING MACHINE HAVING A DISCHARGE MATERIAL RECEIVING DEVICE

BACKGROUND OF THE INVENTION

1. Field of the Invention

This invention relates to a vertical-type injection molding machine which can realize reduction of size and can switch materials efficiently to meet with flexible manufacturing of various types of products in small quantities without interruption of operation.

2. Description of the Related Art

The increase of frequency in making arrangements to cope with flexible manufacturing of various types of products in small quantities in recent years has a great influence on productivity. In order to reduce time for arrangements to switch materials, an improved vertical-type injection molding machine is disclosed in, for example, Japanese Patent Publication No. SHO 63-23892, in which a plurality of injection heads are supported on a turn table turnable on a fixed base about a vertical axis, and a plurality of sets of fixed and movable mold halves concentrically mounted respectively on upper and lower rotary discs via upper and lower attachment plates, the rotary discs being turnable under the fixed base about the same vertical axis.

In the known vertical-type injection molding machine, the upper mold half of upper and lower mold halves which is toward an injection nozzle is a fixed mold half and the lower mold half remote from the injection nozzle is a movable mold half. The used injection head is shifted to the material switching position when the material of one color is changed to that of another color, while another injection head for which arrangements for the following injecting operation has been previously completed is shifted to the injecting position. Thus the change of color of material is performed within a short time. Since the plurality sets of movable and fixed mold halves can be switched one another, it is possible to form different shapes of molded products by switching necessary mold sets.

However, the vertical-type injection molding machine disclosed in the above-identified publication has a rather complicated structure. Further, partly since the fixed base is located centrally of the machine, and partly since the injection heads are located above the fixed base while the plural sets of upper and lower mold halves are located under the fixed base, the upper mold half must be fixed and the lower mold half must be movable, in order to reduce upward and downward strokes of the injection nozzle to a minimum.

Further, when a slide fastener chain having a pair of interengaged coupling element rows mounted centrally on a pair of continuous fastener tapes along its entire length is processed with high dimensional precision while it is continuously fed, it is necessary to control the tension of the chain with very high precision. Accordingly, when the vertical-type injection molding machine disclosed in the above-identified publication is used in processing a slide fastener chain, the slide fastener chain must be conveyed hanging in midair in contact with the surface of the fixed upper mold half. If the chain was guided and supported on the movable lower mold half, the conveyer for the slide fastener chain should have been raised and lowered in synchronism with the movement of the lower mold half, and the structure would have been complicated and large-sized so that the machine could not have been put into practical use.

On the other hand, in the conventional injection molding machine equipped with no cleaner, a lost shot is made into the mold during the switching of the materials. Since operations such as moving of the injection nozzle, opening and closing of the mold and clamping of the mold for every lost shot are performed according to the ordinary injection molding procedure, time needed for switching materials coincides with time needed for ordinary injection molding, thus resulting in a great time loss in continuous flexible manufacturing.

With the foregoing problems in view, it is an object of this invention to provide a vertical-type injection molding machine which utilizes the spacewise advantage of the conventional vertical-type injection molding machine in view of that there should be small economical influence on flexible manufacturing even a small time loss during the switching of materials is involved, and which is simple in mechanism and secures a high dimensional precision of products and can sharply reduce arrangements, such as color change and material switching, compared to conventional.

SUMMARY OF THE INVENTION

According to this invention, there is provided a a vertical-type injection molding machine, which comprises a lower fixed mold half mounted on a machine base, an upper movable mold half situated upwardly of the lower fixed mold half in confronting relationship therewith, and a material reservoir for storing a cleaning material and a various kinds of molding materials individually. The material reservoir has a switching means for switching one kind of molding material over another; an injector having a nozzle, an injection cylinder, and a molding material supply unit connected to the switching means via a material supply pipe; means for opening and closing a tip of the nozzle during the switching of the molding materials, and a discharged material receiving device reciprocatingly movable between a position right under the nozzle tip and a position right above a material discharge portion on the side of the upper movable mold half and adapted to be inverted by 180°.

Preferably, the material reservoir includes a block having a plurality of material containers on an upper surface thereof, a plurality of material passageways extending vertically to communicate with lower openings of the material containers, a plurality of first opening and closing plates for opening and closing the lower openings of the material containers and a plurality of second opening and closing plates for opening and closing lower openings of the material passageways, and a block support member supporting the block in such a manner that the block is slidable in a direction of arrangement of the material containers, the block support member having operating means movable along the block for selectively actuating the first and second opening and closing plates according to a predetermined procedure. Further, the nozzle tip opening and closing means is a plate operatively connected to a hydraulic cylinder for horizontal movement.

The operational procedure of the vertical-type injection molding machine will now be described concentrating on operating steps during the switching of materials. The actions of the individual parts or elements take place automatically according to production management and operational procedure programs stored in a non-illustrated control unit.

When the next injection molding using a new molding material is about to start after completion of a preceding injection molding using a previous molding material, the automatic switching means of the material supply unit will be opened to introduce air from outside and, at the same time, to discharge the powdery residue of the molding material stuck and left inside the material supply unit outwardly via a suitable filter. Meanwhile, in the material reservoir, a drive means for the block is operated to adjustably move the block supported by the block support member to move the cleaning material container to a predetermined position and to actuate the first opening and closing plate to open the lower opening of the cleaning material container to collect a predetermined amount of cleaning material in a space above the second opening and closing plate located downwardly of the first opening and closing plate. Simultaneously, the block is kept at that position by a suitable positioning mechanism.

After closing the lower opening of the container by actuating the first opening and closing plate again, the second opening and closing plate is actuated to open the lower opening of the block to suck and collect the cleaning material into the material supply unit via the material supply pipe. Upon completion of this collecting, the cleaning material is supplied to the injection cylinder to perform lost shots (i.e. shots outside the mold) of the injection molding machine so that the previous molding material remaining in the cylinder is injected.

During this lost shots, the injection nozzle is located in the waiting position, rather than the ordinary injecting position. At that time, the nozzle opening and closing means of the material discharge portion is retracted from the injection nozzle tip to such a position as not to interfere with the upward and downward movements of the injection nozzle, and the discharged material receiving device extends to a position right under the injection nozzle tip with its material inlet end directed upwardly. Therefore, by performing the lost shots, the injected cleaning material is received by the discharged material receiving device. With one or more lost shots, when the old molding material remaining inside the injection cylinder is cleared off, the nozzle opening and closing means moves to the nozzle tip closing position and retracts the discharged material receiving device to the side of the upper movable mold half, whereupon a turning means is operated to turn the discharged material receiving device by 180° and the used cleaning material falls down into a discharge container.

Upon completion of this cleaning, the nozzle opening and closing means of the material discharge portion returns to the waiting position so as not to interfere the upward and downward movements of the injection nozzle, and on the other hand, in the material reservoir, the same operation as mentioned above takes place so that the block is moved to introduce a predetermined amount of new molding material from the next material container to the material supply unit. Then, the automatic switching means is be opened to supply the new molding material from the material supply unit into the injection cylinder so that injection molding of the new molding material will start. This injecting will take place according to the operational procedure for the ordinary molding, during which the nozzle opening and closing means and discharged material receiving device are located in the above-mentioned waiting position. As these successive operations are repeated, injection molding will take place for new molding materials one after another so that a desired amount of molded products will be automatically manufactured one after another.

DETAILED DESCRIPTION

Figure 1:
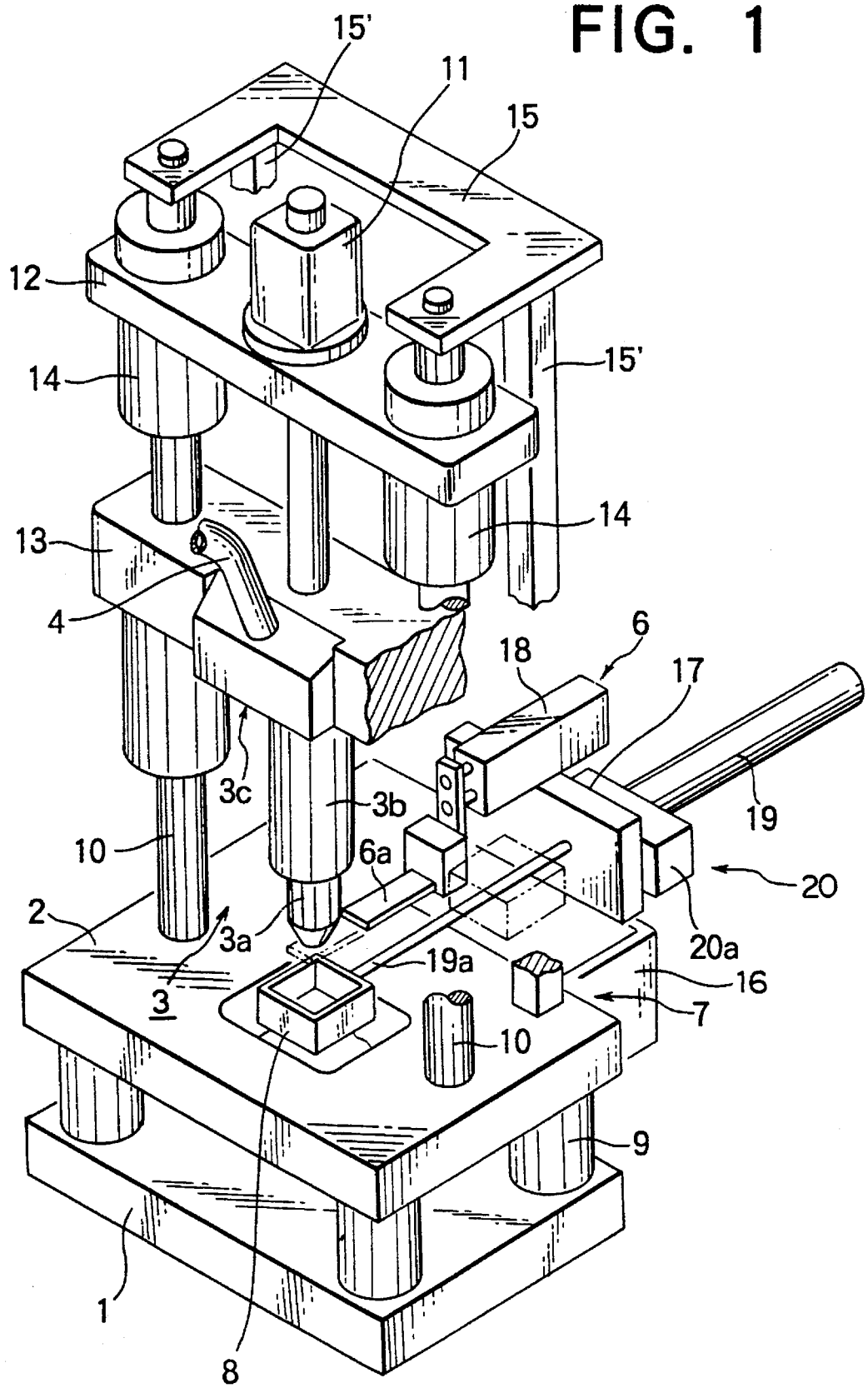
FIG. 1 is a perspective view of a vertical-type injection molding machine according to a typical embodiment of this invention.
Figure 2:
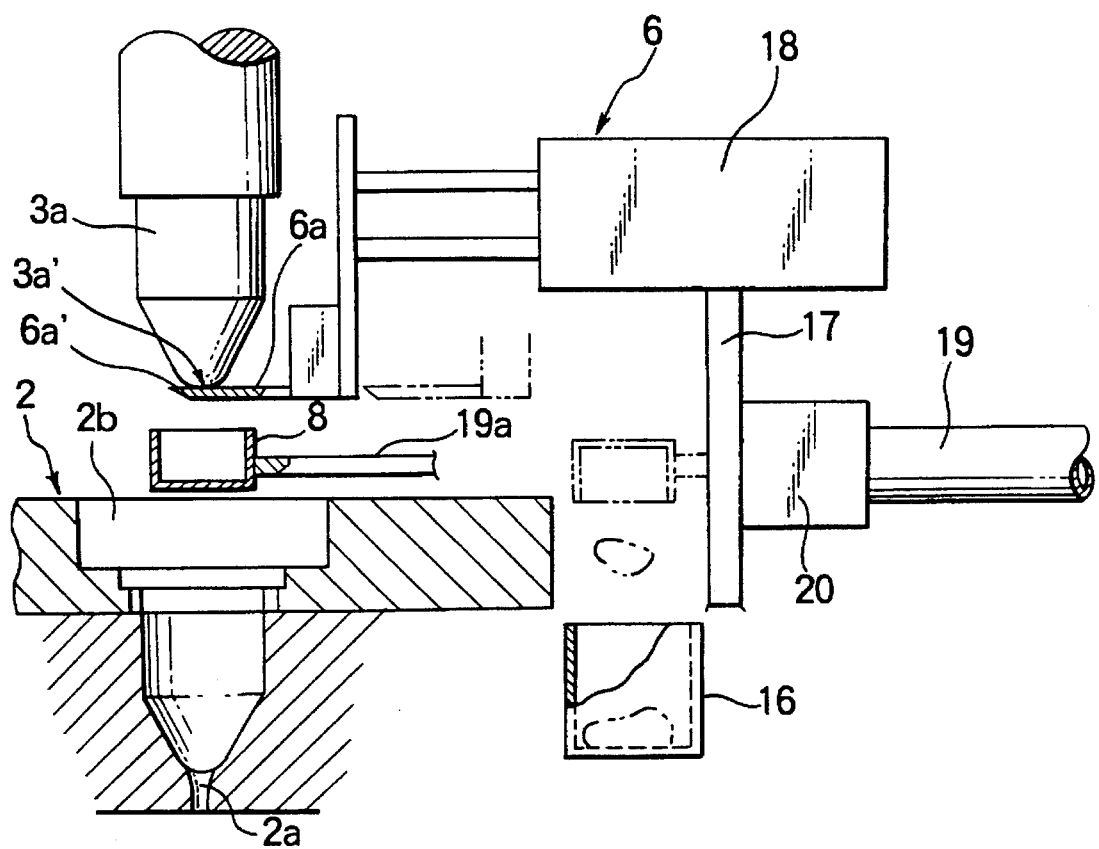
FIG. 2 is a fragmentary enlarged cross-sectional view of the machine, showing the operation of a material discharge portion of the invention.
Figure 3:
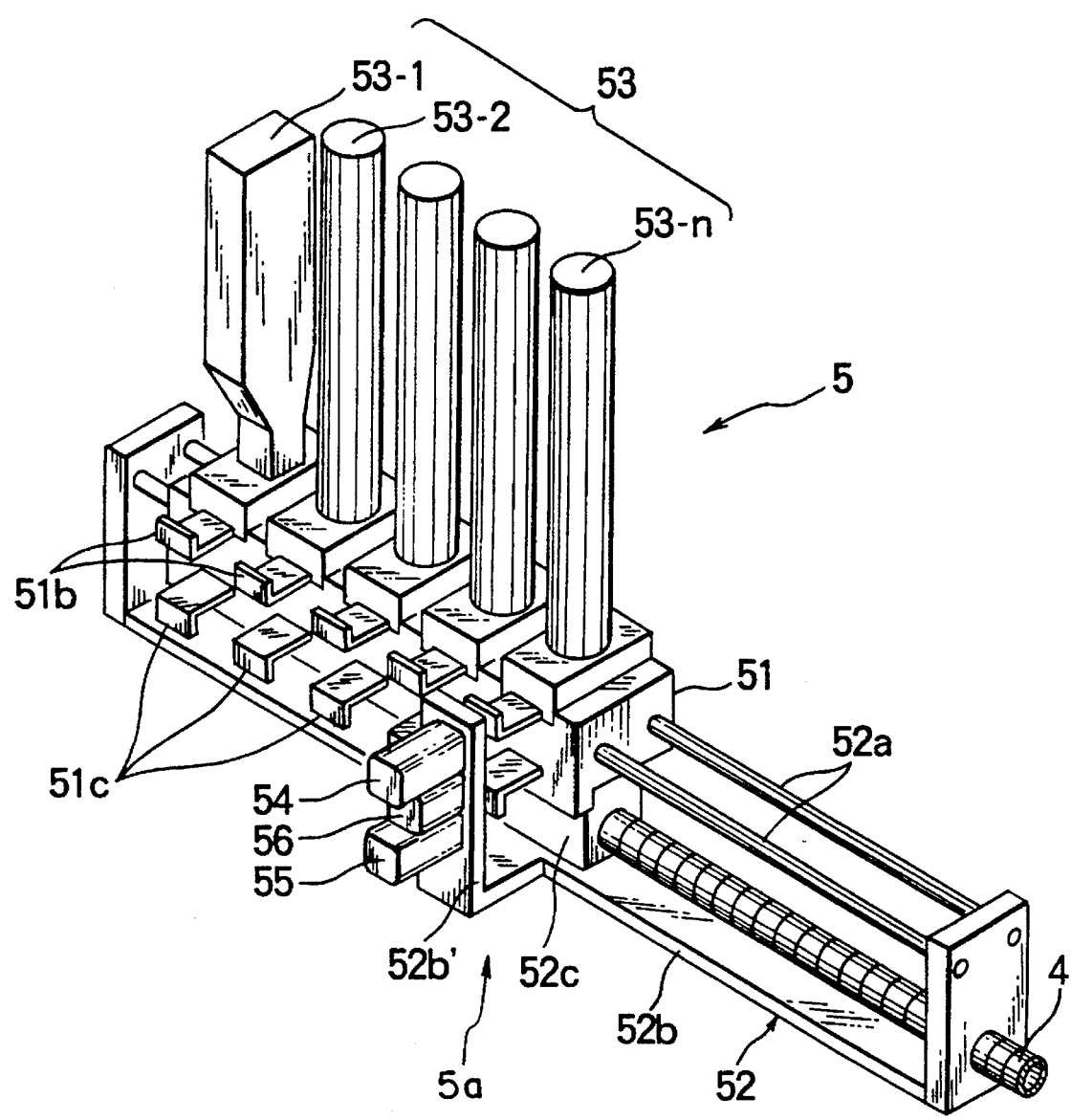
FIG. 3 is a perspective view showing solely a structural example of a molding material reservoir to be used in the invention.
Figure 4:
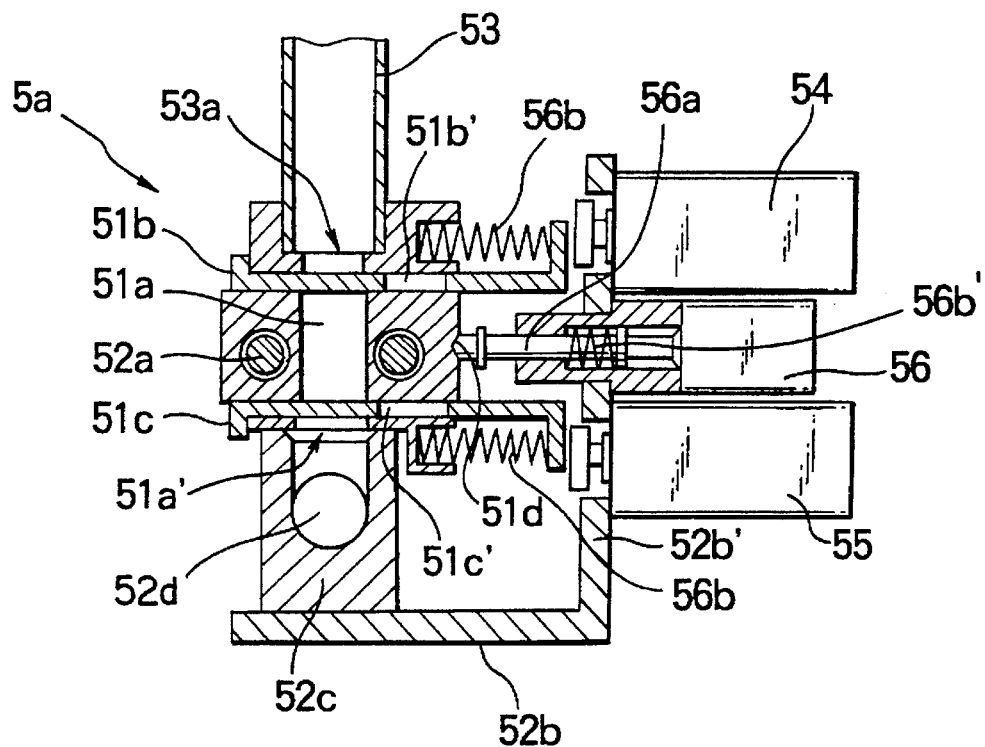
FIG. 4 is a cross-sectional view showing a main part of the molding material reservoir.

An embodiment of this invention will now be described in detail with reference to the accompanying drawings. FIG. 1 is a fragmentary perspective view of a vertical-type injection molding machine, for a slide fastener chain, according to a typical embodiment of this invention. FIG. 2 is a front view, with parts broken away, of the machine, showing the manner in which the discharged material is disposed during a screw cleaning and material switching. FIG. 3 is a perspective view showing the whole appearance of a material reservoir used in this embodiment. And FIG. 4 is a fragmentary cross-sectional view of the material reservoir. In these drawings, ordinary mechanisms or parts of an injection molding machine, and the control mechanism of the material reservoir are omitted.

The vertical-type injection molding machine of this invention comprises a lower fixed mold half 1 fixedly mounted at least on the top surface of a base, an upper movable mold half 2 situated upwardly of and in confronting relationship with the fixed mold half 1 and vertically movable by a cylinder body 9, and an injector 3 having an injection nozzle 3a vertically movable toward a sprue 2a of the upper movable mold half 2. A molding material supply unit 3c of the injector 3 is connected, via a material supply pipe 4, to a material reservoir 5 having a material switching unit 5a and adapted for storing a cleaning material and a number of kinds of molding materials individually. The injection molding machine further includes a nozzle opening and closing unit 6 for opening and closing an injection nozzle tip 3a' at a suitable timing during the switching of materials, and a discharged material receiving device 8 reciprocatingly movable between a position right under the injection nozzle 3a and a position right above a material discharge cutout 7 in the peripheral edge of the upper movable mold half 2 and invertible by 180° above the material discharge cutout 7.

In FIG. 1, the fixed mold half 1 is supported at four corners by four cylinder bodies 9 fixed to the non-illustrated base, and the movable mold half 2 is fixed at four corners to four piston rod ends of the respective cylinder bodies 9. These four cylinders serve to clamp the mold in this invention. On the upper surface of the lower fixed mold half 1, a non-illustrated fixed die is attached, and on the lower surface of the upper movable mold half 2, a non-illustrated movable die is attached in confronting relationship with the fixed die.

In the illustrated example, there is a pair of confronting guide support posts 10 standing on the peripheral edge of the upper movable mold half 2. On the guide posts 10, a fixed plate 12 fixedly supporting a screw driving motor 11, and an injection cylinder support member 13 in the form of a block are supported, the injection cylinder support member 13, together with the injection cylinder 3b, being upwardly and downwardly movable by a drive unit 14. The drive unit 14 could be realized because, for example, both the guide posts 10 have a cylindrical structure. Alternatively, a drive cylinder may be installed independently of the guide posts 10. The upper ends of the two guide posts 10 are fixed to a generally C-shape support plate 15, and the support plate 15 and the upper movable mold half 2 are connected and fixer to one another by two square posts 15', thus supporting the injection cylinder 3b firmly.

To the injection cylinder support member 13, the injection cylinder 3b is vertically fixed with the injection nozzle 3a directed downwardly, and the molding material supply unit 3c is attached. To a material inlet of tile molding material supply unit 3c, the material supply pipe 4 connected with the material reservoir 5 is connected. To the fixed plate 12, the screw driving motor 11 is fixed. At that time, the tip of the injection nozzle 3a is located in confronting relationship with an injection cylinder insertion hole 2b of the upper movable mold half 2.

Figure 5:
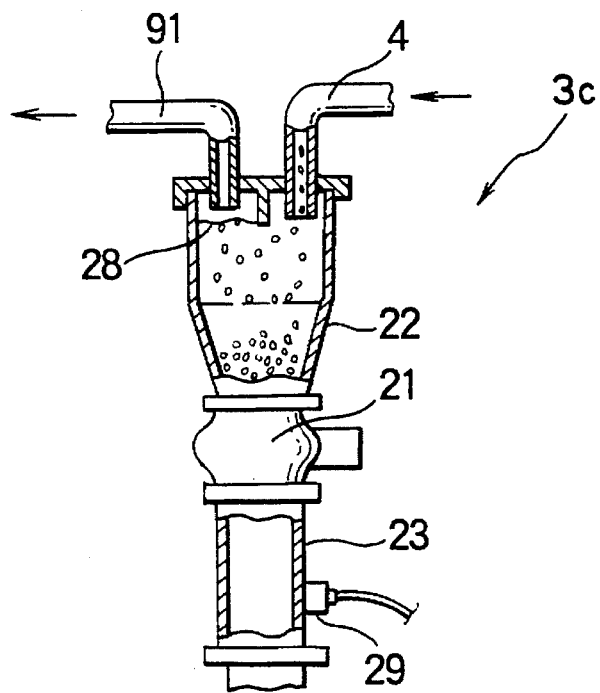
FIG. 5 is a cross-sectional view showing one example of a material supply unit of the vertical-type injection molding machine embodying the invention.

The molding material supply unit 3c may have the same structure as that of a molding material supply unit disclosed in, for example, U.S. Pat. No. 5,282,548. FIG. 5 shows the structure of the known molding material supply unit, and its structure and operation are described only briefly. The construction of the molding material supply unit 3c should by no means be limited to an illustrated example.

The molding material supply unit 3c of FIG. 5 includes first and second hoppers 22, 23 situated respectively over and under an automatic switching valve 21 such as an electromagnetic valve. Each of the hoppers 22, 23 has a minimal hollow commensurate with the injection molding ability. To material inlet of the first hopper 22, the material supply pipe 4 for supplying a molding material into the first hopper 22 is connected. The first hopper 22 is connected to a non-illustrated vacuum pump via an air suction pipe 91 for sucking air inside the first hopper 22 by the pump. Over an opening of the air suction pipe 91 of the first hopper 22, a filter (net) 28 for preventing the molding material from being sucked is stretched.

With the automatic switching valve 21 between the first and second hoppers 22, 23, even when the second hopper 23 is normally open to the injector 3, if the automatic switching valve 21 is closed, the first hopper 22 is negatively pressurized adequately by the non-illustrated vacuum pump which sucks the molding material. And also, even while the interior of the first hopper 22 is thus under negative pressure, it does not influence at all on the molding material already supplied into the second hopper 23 and will not interfere with supplying of the molding material to the injector 3. If a level sensor 29 is mounted on the side surface of the second hopper 23, it is possible to detect the level of the molding material in the hopper 23 during injection molding and to give an instruction to resupply material from the material reservoir 5 via a non-illustrated control unit.

On the other hand, the upper fixed mold half 2 has in the peripheral edge a cutout 7, right under which a discharged material container 16 for receiving the discharged material from the injector 3 during the switching of materials. The cutout 7 corresponds to a material discharge portion in which a material discharge device is situated as the most important part of this invention. The material discharge portion is composed of a nozzle opening and closing unit 6 for opening and closing the injection nozzle tip 3a' at a suitable timing during the switching of materials, and a discharged material receiving device 8 reciprocatingly movable between a position right under the injection nozzle 3a and a position right above the cutout 7 in the peripheral edge of the upper movable mold half 2 and invertible by 180° above the cutout 7. The operation timings are determined by operation signals from the non-illustrated control unit, based on a predetermined operational procedure.

In the illustrated example, the nozzle opening and closing unit 6 is a single blade 6a having a cutting edge 6a'. The blade 6a assumes a horizontal posture in such a manner that its flat portion comes into contact with the injection nozzle tip 3a' in the waiting position. And the blade 6a is reciprocatingly movable, by a first air cylinder 18 fixedly supported on part of a frame 17, between the position in which it is in contact with the injection nozzle tip 3a' and the postilion in which it is retracted from the injection nozzle tip 3a' and does not interfere with the upward and downward movement of the injection nozzle 3a.

The discharged material receiving device 8 is in the form of a box with its top open. To the box's side facing the cutout 7, an end of a support bar 19a extending from the rod end of a second air cylinder 19 fixedly supported on part of the frame 17 is fixed. By the second air cylinder 19, the discharged material receiving device 8 is moved forwardly and backwardly between the position right under the injection nozzle tip 3a' in the waiting position and the position right above the cutout 7. Further, on the frame 17, a turning device 20 for turning the second air cylinder 19 in opposite directions by 180° is mounted. In the illustrated example, the turning device 20 has a turning air cylinder 20a, by which the discharged material receiving device 8 is turned by 180° forwardly and backwardly via a non-illustrated power transmission mechanism such as a rack and a pinion. Alternatively, an ordinary stepping motor may be used.

Although the material reservoir 5 to be connected to the molding material supply unit 3c of the injector 3 via the material supply pipe 4 may have the same construction as disclosed in U.S. Pat. No. 5,282,548, the material reservoir of FIGS. 3 and 4 is used in this embodiment. The construction of the material reservoir will now be described in detail. The material reservoir 5 of FIGS. 3 and 4 has a block 51 and a block support member 52.

Longitudinally on the upper surface of the block 51, a plurality of cylindrical material containers 53 are aligned in parallel to one another. The block 51 has a plurality of material passageways 51a vertically extending through the block 51 to communicate with a lower openings 53a of the respective containers 53. On the block 51, there are slidably mounted a plurality of first opening and closing plates 51b each for opening and closing the lower opening 53a of the respective material reservoir 53 and a plurality of second opening and closing plates 51c each for opening and closing a lower opening 51a' of the respective material passageway 51a. The first and second opening and closing plates 51b, 51c have the same structure, in the central portion of each of which a material passage hole 51b', 51c' communicating with the respective opening 53a, 51a' is formed, and are urged by the resilience of compression springs 56b, 56b in such a manner that the material passage holes 51b', 51c' are normally not aligned with the openings 53a, 51a', respectively. Of the plural material containers 53, one is a cleaning material container 53-1 in which cleaning chips are stored, and the remaining containers are molding material containers 53-2–53-n in which, for example, different colors or qualities of molding chips are respectively stored.

The block support member 52 includes a pair of guide bars 52a supporting the block 51 in such a manner that the block 51 is slidable in the direction of arrangement of the plural material containers 53, a generally C-shape support frame member 52b fixedly supporting opposite ends of the guide bar 52a, a material receiving intermediate block 52c fixed to the support frame member 52b and connected to one end of the material supply pipe 4, first and second opening and closing cylinders 54, 55 fixed to a bracket portion 52b' of the support frame member 52b projecting from the front side of the material receiving intermediate block 52c and operatively connected to the first and second opening and closing plates 51b, 51c for actuating them independently, and a positioning cylinder 56 situated between the first and second opening and closing cylinder 54, 55 for positioning the block 51. Accordingly, the rod ends of the first and second opening and closing cylinders 54, 55 are situated in confronting relationship with the first and second opening and closing plates 51b, 51c, respectively. A positioning pin 56a attached to the rod end of the positioning cylinder 56 is in a retracted position under the resilience of a compression spring 56b' when the cylinder 56 is inoperative, and when the cylinder 56 is operative, the positioning pin 56a is extended against the resilience of the spring 56b' to engage in a positioning recess 51d formed in the front surface of the block 51 at a position corresponding to the individual material container 53-1–53-n.

In order to controllably move the block 51 along the guide bar 52a, a non-illustrated drive mechanism situated on the back side of the block and the block support member 52. This drive mechanism is exemplified by a rack-and-pinion drive in which a pinion is mounted on the output shaft of a non-illustrated servo motor, or a ball-nut-and-ball-screw drive in which a ball nut is formed longitudinally in and through the block 51 and a non-illustrated ball screw parallel to the guide bar 52a is supported on the block support member 52 and is attached at its end to, for example, a servo motor.

In the material reservoir 5 of FIGS. 3 and a material passage hole 52d of tile material receiving intermediate block 52c allows a desired material to pass through it by an air blow from an air blow source on the rear surface of the material receiving intermediate block 52c, with which source a non-illustrated ventilation hole communicates, so that the material is supplied to the molding material supply unit 3c of the injector 3 via the material supply pipe 4.

The operational procedure of tile vertical-type injection molding machine of this invention will now be described concentrating on operating steps during the switching of materials. The actions of the individual parts or elements take place automatically according to production management and operational procedure programs stored in the non-illustrated control unit. In the following description, the supplying of molding material to the molding material supply unit 3c of tile injector 3 is performed using a device shown in FIG. 5.

When the next injection molding with a new molding material is about to start upon completion of the preceding injection molding with the previous molding material, firstly the vacuum pump is operated and, at the same time, the automatic switching valve 21 situated between the first and second hoppers 22, 23 of the injection molding supply unit 3c is opened to suck air from outside so that the powdery residue of old molding material powder stuck and left inside the first and second hoppers is discharged outwardly via the filter 28 and the air suction pipe 91. At that time, in the material reservoir 5, a non-illustrated block drive mechanism is operated to controllably move the block 51 along the guide bar 52a, thus moving the cleaning material container 53-1 to a position right above the material receiving intermediate block 52c. The block drive mechanism causes also the first opening and closing cylinder 54 to expand to push the first opening and closing plate 51b in such a manner that the material passage hole 51b' comes into a position to communicate with the lower opening 53a of the cleaning material container 53-1, thus collecting the cleaning material in the container, into a space above the second opening and closing plate 51c to a predetermined amount. Simultaneously, the positioning cylinder 56 is operated to cause the positioning pin 56a to project against the resilience of the compression spring 56b to engage in the corresponding positioning recess 51d of the block 51, thus holding the block 51 in that position.

Then, after the first opening and closing cylinder 54 is operated again to close the lower opening 53a by the first opening and closing plate 51b, the second opening and closing cylinder 54 is operated to expand to push the second opening and closing plate 51c in such a manner that the material passageway 51a comes to communicate with the material passage hole 51c' so that a predetermined amount of cleaning material is collected into the first hopper 22 as sucked by the vacuum pump via the material receiving intermediate block 52c and the material supply pipe 4. Upon completion of this collecting, the automatic switching valve 21 is opened to allow the cleaning material to be supplied to the injection cylinder 3b, whereupon the injection molding machine performs lost shots to eject the old molding material remaining inside the injection cylinder 3b.

During this lost shots, the injection nozzle is located in the waiting position, rather than in the ordinary injecting position, where ejection will take place. At that time, the blade 6a of the nozzle opening and closing unit 6 assumes a retracted position in which it is retracted from the injection nozzle tip 3a' by the first air cylinder 18 so as not to interfere with upward and downward movements of the injection nozzle 3a. The discharged material receiving device 8, with the material inlet directed upwardly, extends to a position right under the injection nozzle tip 3a' in the waiting position by the second air cylinder 19. Accordingly, the cleaning material ejected by lost shots is received in the discharged material receiving device 8. With one or more times lost shots, when the old molding material remaining inside tile injection cylinder 3b is cleared off, the first air cylinder 18 is operated to bring the blade 6a to the nozzle tip closing position as indicated by solid lines in FIG. 2. And the second air cylinder 19 is operated to shrink to retract the discharged material receiving device 8 to the cutout 7 side of the upper movable mold half 2 as indicated by phantom lines in FIG. 4, whereupon the turning device 20 is operated to turn the discharged material receiving device 8 by 180° and the used cleaning material falls down into the discharge container 16 as indicated by phantom lines in FIG. 2.

Upon termination of this cleaning, the blade 6a of the nozzle opening and closing unit 6 is returned to the waiting position so as not to interfere with upward and downward movements of the injection nozzle 3a. In the material reservoir, as the same operation as described above takes place, the block 51 is moved to supply a predetermined amount of new molding material from the material container 53-2, in which new molding material for the next injection molding is stored, to the material supply unit 3c of the injector 3. Then, the automatic switching valve 21 is opened to allow the new molding material into the injection cylinder 3b via the second hopper 23 so that injection molding with the new molding material will start. This injection is performed according to the operational procedure of the ordinary molding, in which time the material discharge portion assumes in the waiting position.

As these successive operations are repeated, injection molding with successive new molding materials is continued to automatically manufacture various kinds of a desired quantity of molded products one after another. The foregoing is only the description of a typical embodiment of this invention; this invention should by no means be limited to the illustrated example, so various modifications may be suggested.

With this arrangement, it is possible to reduce a time loss in material change to a minimum and to cope with flexible manufacturing. Further, only by adding a simple discharged material processing unit, i.e., without making any special improvement over the conventional vertical-type injection molding machine, it is possible to discharge the discharged material out of the machine easily and to secure high dimensional precision. It is also possible to realize a continuous injection molding machine which can reduce arrangements, such as for color changing and material switching, remarkably as compared to the conventional art.

What is claimed is:

1. A vertical injection molding machine comprising:
   (a) a lower fixed mold half mounted on a machine base;
   (b) an upper movable mold half situated upwardly of said lower fixed mold half in confronting relationship therewith;
   (c) an injector having a nozzle, cylinder, and a molding material supply unit;
   (d) means for opening and closing a tip of said nozzle; and
   (e) a discharged material receiving device reciprocatingly movable between a position right under the nozzle tip and a position right above a material discharge portion on the side of said upper movable mold half and adapted to be inverted by 180°.

2. A vertical injection molding machine according to claim 1, wherein said nozzle tip opening and closing means is a plate operatively connected to a hydraulic cylinder for horizontal movement.

3. A vertical injection molding machine according to claim 1, further comprising a material reservoir for storing at least one of various kinds of molding materials individually, said material reservoir having means for switching one of said various kinds of molding material over another.

4. A vertical injection molding machine according to claim 3, wherein said molding material supply unit is connected to said switching means via a material supply pipe.

5. A vertical injection molding machine according to claim 3, wherein said nozzle tip opening and closing means is actuated during the switching of the molding materials.

6. A vertical injection molding machine according to claim 1, wherein said material reservoir includes a block having a plurality of material containers on an upper surface thereof, a plurality of material passageways extending vertically to communicate with lower openings of said material containers, a plurality of first opening and closing plates for opening and closing said lower openings of the material containers and a plurality of second opening and closing plates for opening and closing lower openings of said material passageways, and a block support member supporting said block in such a manner that said block is slidable in a direction of arrangement of said material containers, said block support member having operating means movable along said block for selectively actuating said first and second opening and closing plates according to a predetermined procedure.

* * * * *